United States Patent [19]

Arnason et al.

[11] Patent Number: 4,752,632

[45] Date of Patent: Jun. 21, 1988

[54] ASPHALTIC ELASTOMERS

[75] Inventors: Sigurdur I. Arnason, Worthington; Michael A. Kunke, Dublin, both of Ohio

[73] Assignee: Signastone Incorporated, Columbus, Ohio

[21] Appl. No.: 888,850

[22] Filed: Jul. 22, 1986

[51] Int. Cl.[4] ..................... C08L 75/08; C08L 95/00
[52] U.S. Cl. ........................ 524/60; 524/71; 525/54.5
[58] Field of Search ............. 524/69, 60, 61, 71; 525/54.5; 252/311.5

[56] References Cited

U.S. PATENT DOCUMENTS 3,778,397 12/1973 Gannon et al. ............... 524/60
3,932,331 1/1976 Doi et al. ..................... 524/71
4,415,702 11/1983 Ono et al. .................... 524/59

FOREIGN PATENT DOCUMENTS 0594152 2/1978 U.S.S.R. ....................... 524/60

Primary Examiner—Allan M. Lieberman

[57] ABSTRACT

Disclosed is an asphaltic elastomer and a method for its preparation. The asphaltic elastomer is synthesized from ingredients which are blended. These ingredients include an aqueous asphaltic phase, a polyisocyanate prepolymer, and optionally an organic cosolvent effective in compatibilizing the polyisocyanate prepolymer and water. The proportion of water from the asphaltic phase or as added being such that the molar ratio of water to isocyanate groups is greater than 1. The polyisocyanate prepolymer is formed from the reaction of an organic polyisocyanate and an organic polyether polyol containing at least about 40 weight percent ethylene oxide units.

18 Claims, No Drawings

ASPHALTIC ELASTOMERS

BACKGROUND OF THE INVENTION

The present invention relates to asphalt compositions and more particularly to a unique asphaltic elastomer.

Asphalt is defined by ASTM as a dark brown to black cementitious material in which the predominating constituents are bituminens that occur in nature or are obtained in petroleum processing. ("Terms Relating To Materials For Roads And Pavements", ASTM designation D8). Asphalts traditionally have been used as protective films, adhesives, and binders, because of their waterproof and weather-resistant properties. Asphalt can be provided in a variety of forms as well as processed by a variety of techniques. These processing techniques include reduction, propane deasphalting, air-blowing, and the like. The resulting products can be catalytic asphalt, thermal asphalt, blended asphalt, asphalt emulsions, and the like.

Despite the apparent flexibility in processing asphalt into a variety of forms and products, one important asphalt-based product has eluded the art—asphalt elastomers. An elastomer for present purposes is a substance having the properties of natural, reclaimed, vulcanized, or synthetic rubber in that the substance stretches under tension, can have a high tensile strength, can retract rapidly, and can recover to substantially its original dimension. Often, elastomers are loosely called "rubbers". Because of the waterproof and weather-resistant properties of asphalt, an elastomer made therefrom would be a highly desirable product.

The present invention is addressed to such need in the art.

BROAD STATEMENT OF THE INVENTION

Broadly, the present invention is directed to an asphalt elastomer and to a method for making such elastomer. The method may be thought of in terms of the vulcanization of asphalt. This method comprises blending the following ingredients: an aqueous asphaltic phase; a polyisocyanate prepolymer in an amount of at least about 1 weight percent based on said asphaltic phase and sufficient to form a coherent elastomeric mass, said polyisocyanate prepolymer formed from the reaction of an organic polyisocyanate and an organic polyether polyol containing at least about 40 weight percent ethylene oxide units; optionally, an organic cosolvent in an amount effective in enhancing compatibilization of said polyisocyanate prepolymer and water for their reaction. The proportion of water from the asphaltic phase or added being such that the molar ratio of water to isocyanate groups is greater than 1. The asphaltic elastomer can contain a variety of modifiers typically used in the production of elastomers including the addition of conventional elastomers as an ingredient in making the inventive asphaltic elastomer of the present invention.

Advantages of the present invention include the ability to rapidly and inexpensively manufacture an elastomr based on asphalt. A further advantage is the ability to control the rate of formation of the elastomer for flexibility in its manufacture and processing. Another advantage is the ability to form an open cell or closed cell asphaltic elastomer and the ability to form an asphaltic foamed elastomer. These and other advantages will be readily apparent to those skilled in the artbased upon the disclosure contained herein.

DETAILED DESCRIPTION OF THE INVENTION

The asphalt-based component of the asphaltic elastomers of the present invention are referred to as an "aqueous asphaltic phase". Such aqueous asphaltic phase includes traditional asphalt emulsions which primarily find great utility in forming the asphaltic elastomers of the present invention. Broadly, however, any form of stable dispersion of asphalt in water can be suitably used in accordance with the precepts of the present invention. Asphalt and asphalt emulsions are well known in the art, further details being provided, for example, in *Kirk-Othmer Encyclopedia of Chemical Technology*, Third Edition, Volume 3, pp. 284-322, (Interscience Publishers, New York, N.Y., 1978.)

The proportion of water contained in the aqueous asphaltic phase is not critical since excess quantities of water are not adverse in forming the asphalt or asphaltic elastomer, but primarily determines the ultimate mass or volume of the resulting coherent elastomeric mass or elastomer formed in accordance with the present invention. Certainly, the asphalt content of the aqueous asphaltic phase will, to an extent, control the properties of the ultimate elastomer so that the asphalt content of the aqueous asphaltic phase should be controlled and adjusted in accordance with the ultimate use and performance requirements of the elastomer being manufactured.

The next ingredient utilized in forming the novel asphaltic elastomer is a polyisocyanate prepolymer. The polyisocyanate prepolymer is formed from the reaction of an organic polyisocyanate, prefersbly a diisocyanate, and an organic polyether polyol containing at least about 40 weight percent ethylene oxide units or adducts. Virtually any polyisocyanate finds utility including, for example, toluene diisocyanate, polymethylene-polyphenylene-diisocyanate, isophorone diisocyanate, optionally in admixture with triisocyanates and higher polyisocyanates. Aromatic polyisocyanates are preferred for use in making the novel asphaltic elastomers of the present invention.

The polyether polyol utilizes typical polyols including diols and triols such as glycerine or a glycol (e.g. ethylene glycol, propylene glycol, diethylene glycol, etc.). Such polyols can be reacted with an alkylene oxide including ethylene oxide, propylene oxide, and butylene oxide, for example, to form polyether polyol adducts useful in forming the polyisocyanate prepolymer. A high concentration of ethylene oxide units in the polyol ingredient achieves water retention characteristics which contribute to the unusual performance characteristics possessed by the novel asphaltic elastomer. The polyether polyol can have a molecular weight ranging from as low as about 3,000 to about 10,000 or more. The polyisocyanate prepolymer advantageously has an isocyanate value of between about 2.5 and 3 weight-percent. Within the molecular weight range and isocyanate value set forth above, the polyether polyol will have between about 1.8 and 7 isocyanate groups per molecule.

One preferred polyisocyanate prepolymer is Aquapol 35-0019 urethane prepolymer further described in U.S. Pat. No. 4,517,326 (Freeman Chemical Corporation, Fort Washington, Wis.). Other suitable commercially available polyurethane prepolymers include Flexgel prepolymer (De Neef America, Inc., St. Louis, Mich.) and AV-202 (Avanti International, Webster, Tex.). The proportion of polyisocyanate prepolymer should be adequate so that a coherent elastomeric mass is formed. This translates into at least about 1%–2% by weight polyisocyanate prepolymer depending upon the solids loading of the system, and can range as high as about 50% by weight of the aqueous asphaltic phase.

The next ingredient utilized in forming the novel asphaltic elastomer is an organic cosolvent. The asphaltic phase being aqueous tends to exhibit expected hydrophylicity, while the polyisocyanate prepolymer exhibits expected hydrophobicity. Thus, a phase incompatibility between the aqueous asphaltic phase and the polyisocyanate prepolymer may be evidenced when the aqueous asphaltic phase is mixed with the polyisocyanate prepolymer. Consequently, an organic cosolvent preferably is utilized in an amount effective in compatibilizing the polyisocyanate prepolymer and water for their reaction. The type of organic cosolvent does not appear critical so long as sufficient compatibility is achieved for the polyisocyanate prepolymer/water reaction to proceed and result in the formation of a coherent elastomeric mass. The preferred solvent is acetone, while other solvents suitable for compatibilizing the ingredients of the asphaltic elastomer include, for example, glycol ethers (e.g. ethylene glycol monobutyl ether and the like Cellosolve solvents), ester alcohols (e.g. 2,2,4-trimethyl-1,3-pentanediol), and the like and mixtures thereof.

Alternatively, especially efficient mixing (e.g. high shear mixing) can effectively compatibilize the aqueous asphaltic phase and the polyisocyanate prepolymer so that the presence of organic cosolvent is not required. Performance requirements, energy requirements (e.g. mixing), desirability of handling organic cosolvent, and like factors may be used in determining the scheme of choice in compatibilizing the elastomeric reactants in accordance with the teachings herein.

The final ingredient necessary in forming the asphaltic elastomer is water. Water is supplied from the aqueous asphaltic phase, though on occasion additional quantities of water need to be added in forming the asphaltic elastomer of the present invention. The proportion of water added to the system or supplied by the asphaltic phase should be sufficient so that the molar ratio of water to isocyanate groups is greater than 1. If this ratio is not achieved, carbon dioxide is evolved and performance of the asphaltic elastomer may not be adequate for many uses. So long as the water content exceeds the isocyanate content in the ingredients, carbon dioxide evolution is not apparent and a unique coherent elastomeric mass or elastomer results. As noted above, excess water does not adversely effect the formation of elastomer nor the reaction occurring in its formation. Instead, the water content can be utilized in determining the ultimate mass or volume of the asphalt elastomer formed from any particular batch of ingredients. The presence of water also can be useful in aiding in the incorporation of a variety of additives and modifiers into the ingredients used in forming the asphaltic elastomer.

While the presence of certain organic cosolvents improves the compatibility of the aqueous asphaltic phase and the polyisocyanate prepolymer, unexpectedly it was determined that a variety of ingredients can be added to the system to retard the formation of the asphaltic elastomer. When only the aqueous asphaltic phase, polyisocyanate prepolymer, and organic cosolvent are used in forming the elastomer, set-up time to achieve a handlable coherent elastomeric mass can occur in but about a minute or so. Such set-up time often can be disadvantageous on commercial lines so that controlling or retarding the reaction may be desirable. Such reaction retardation can be achieved by the addition of a controllant, for example, isopropyl alcohol, methyl ethyl ketone, ammonia (which may suppress the reaction if not controlled), and acetic acid. While the precise explanation for the noted reaction retardation is not yet fully understood, the ability to control the rate of formation of the asphaltic elastomer contributes to the flexibility and value of the present invention.

It will be noted that excess water present as an ingredient in forming the asphaltic elastomer is retained within the elastomer as a discontinuous phase. The ability to retain water is an inherent characteristic of the polyisocyanate prepolymers used in forming the asphaltic elastomers. It should be noted that the water can be baked from the elastomer by infrared, convection oven, or microwave treatment, or can be pushed out of the elastomer by the addition of certain ingredients including, for example, calcium nitrate, aluminum sulfate, and manganese chloride. Such additional ingredients can be utilized to control the final water content, or perhaps more accurately, control the rate of which water is expelled from the resulting asphaltic elastomer.

The elastomer is made simply by adequate blending or admixing of the ingredients. The reaction occurs rapidly with no undue evolution of heat, presumably due to the presence of large quantities of water in the system. The elastomer can be cast as a film, sprayed by conventional spraying equipment designed to spray two component systems, or can be injection molded in a variety of forms. Since a quite pumpable and sprayable blend of ingredients is used to form the elastomer, there is almost no limit to the form in which the resulting elastomer can be manufactured. Thus, the asphalt elastomer will find wide uses as a roofing sealer, in the waterproofing of dams, as a highway sealer, pond sealant, as an automotive mastic or undercoat, to make simulated masonry for consumer goods (e.g. floor or automobile mats, wall coverings, etc.), and like uses. The reactants even may be sprayed on oil or other chemical spills and the contaminated oil retained within the formed asphaltic elastomer for easy clean-up from bodies of water.

Optional ingredients which can be used in forming the asphaltic elastomer include, for example, those modifiers and additives conventionally used in the formation of natural and synthetic elastomers. Such additives include flame retardants, reinforcements (both particulate and fibrous), heavy and light fillers, UV stabilizers, blowing agents, perfumants, antistats, insecticides, bacteriostats, fugicides, surfactants, and the like. Additionally, it should be recognized that additional conventional elastomers can be included as an ingredient in forming the asphalt elastomer. Such additional elastomers include, for example, polychlorobutadiene, styrenebutadiene rubber, nitrile rubber, and the like. Certainly, this flexibility results in truly unique asphaltic elastomers.

The following examples show how the present invention has been practiced but should not be construed as limiting. In this application, all percentages and proportions are by weight unless otherwise expressly indicated. Also, all citations referenced herein are incorporated expressly herein by reference.

EXAMPLES 1-6

Various formulations of asphaltic elastomers were compounded from the following ingredients.

TABLE 1

| Ingredient* | Example No. (wt. parts) | | | | | |
|---|---|---|---|---|---|---|
| | 1 | 2 | 3 | 4 | 5 | 6 |
| Asphalt Emulsion | 62 | 54 | 62 | 67 | 41 | 46 |
| Water | 23 | — | 23 | 23 | 18 | 15 |
| Vinegar (5%) | 7 | — | 7 | — | — | — |
| Acetone | 3 | 1 | — | 3 | — | — |
| Aquapol | 5 | 4 | 5 | 5 | — | — |
| $Al_2O_3H_2O$ | — | 33 | — | — | — | 25 |
| Hypol | — | 8 | — | — | — | — |
| Butyl Cellosolve | — | — | 3 | — | — | — |
| Aluminum Sulfate | — | — | — | 2 | — | — |
| UCAR 874 | — | — | — | — | 10 | — |
| Rubber Particles | — | — | — | — | 23 | — |
| Hydrogel | — | — | — | — | 8 | 3 |
| Glass Microspheres | — | — | — | — | — | 11 |

*Asphalt emulsion-Wesco asphalt emulsion, Warren Wholesale Co., Warren, Ohio.
Aquapol-Aquapol 035-019 diisocyanate prepolymer, U.S. Pat. No. 4,517,326, Freeman, Chemical Corp., Port Washington, Wisconsin.
Hypol-Hypol FHP 2000 foamable hydrophilic polyisocyanate (450–520 equivalent weight per NCO group, 1.95-2.20 NCO content, 10,000-15,000 cps at 25° C., 1.19 g/ml at 25° C.), W. R. Grace & Co., Lexington, Mass.
UCAR 874-Acrylic latex, Union Carbide Corp., Danbury, Connecticut
Rubber Particles-Reclaimed automobile tire rubber particles (110/40 mesh).
Glass Microspheres-Sil-Cel brand fly ash, Silbrico Corp., Hodkins, Ill.
Hydrogel-A developmental polyisocyanate prepolymer, W. R. Grace & Co., believed to be similar in structure to the Aquapol prepolymer.

A typical procedure used to make the elastomers can be illustrated by Example 1 where 62 g. of asphaltic emulsion was mixed by hand with 23 g. of tap water and 7 g. of a 5% acetic acid solution. To this premix 8 g. of Aquapol/cosolvent blend (Aquapol, 5 g./acetone, 3 g). was added and stirred vigorously. The mixture set-up in about 1-2 minutes to form an asphaltic elastomer. Note that without the acetic acid, the mixture typically sets up in about 30-60 seconds.

The elastomer of Example 2 is a foamed elastomer by virtue of the use of the Hypol foamable polyisocyanate. Example 3 illustrates the use of another cosolvent effective in the system. The presence of the aluminum sulfate in Example 4 results in an open cell elastomer. Example 5 demonstrates the ability to add conventional elastomers to the system while Example 6 demonstrates a filled elastomer.

Other formulations have included ingredients such as cement for imparting flame retardancy to the asphaltic elastomer. Additional ingredients utilized in formulations have included perlite, calcium carbonate, red oxide pigment, titanium dioxide, opacifying pigment, sand, and even fertilizer for supporting the germination of seeds in the water filled elastomer. Based on these data, the flexibility and uniqueness of the asphaltic elastomers is demonstrated.

We claim:

1. A method for making an asphaltic elastomer which comprises blending the following ingredients;
    (a) an aqueous asphaltic phase; and
    (b) a polyisocyanate prepolymer having between about 1.8 and 7 isocyanate groups per molecule and present in an amount ranging from between about 1 and 50 weight percent based on said asphaltic phase and sufficient to form a coherent elastomeric mass, said polyisocyanate prepolymer formed from the reaction of an organic polyisocyanate and an organic polyether polyol having a molecular weight of at least about 3,000 and containing at least about 40 weight percent ethylene oxide units; the proportion of water from said asphaltic phase or added being such that the molar ratio of water to isocyanate groups is greater than 1.

2. The method of claim 1 wherein said ingredients additionally include an organic cosolvent in an amount effective in compatibilizing said isocyanate prepolymer and water for their reaction.

3. The method of claim 2 wherein said cosolvent is selected from the group consisting of acetone, a glycol ether, an ester alcohol, and mixtures thereof.

4. The method of claim 1 wherein said polyisocyanate prepolymer comprises an aromatic polyisocyanate prepolymer.

5. The method of claim 1 wherein the polyisocyanate component of said prepolymer is selected from the group consisting of toluene diisocyanate, isophorone diisocyanate, and mixtures thereof.

6. The method of claim 5 wherein said organic polyether polyol has a molecular weight of between about 3,000 and 10,000.

7. The method of claim 1 wherein said polyisocyanate prepolymer has an isocyanate value of between about 2.5 and 3.

8. The method of claim 1 wherein said ingredients additionally include a reaction rate controllant.

9. The method of claim 8 wherein said controllant is selected from the group consisting of isopropyl alcohol, methyl ethyl ketone, ammonia, acetic acid, and mixtures thereof.

10. The asphaltic elastomer product of claim 1.

11. The asphaltic elastomer product of claim 10 wherein said ingredients additionally include an organic cosolvent in an amount effective in compatibilizing said isocyanate prepolymer and water for their reaction.

12. The asphaltic elastomer product of claim 11 wherein said cosolvent is selected from the group consisting of acetone, a glycol ether, an ester alcohol, and mixtures thereof.

13. The asphaltic elastomer product of claim 10 wherein said polyisocyanate prepolymer comprises an aromatic polyisocyanate prepolymer.

14. The asphaltic elastomer product of claim 10 wherein the polyisocyanate component of said prepolymer is selected from the group consisting of toluene diisocyanate, isophereone diisocyanate, and mixtures thereof.

15. The asphaltic elastomer product of claim 14 wherein said organic polyether polyol has a molecular weight of between about 3,000 and 10,000.

16. The asphaltic elastomer product of claim 10 wherein said polyisocyanate prepolymer has an isocyanate value of between about 2.5 and 3.

17. The asphaltic elastomer product of claim 10 wherein said ingredients additionally include a reaction rate controllant.

18. The asphaltic elastomer product of claim 17 wherein said controllant is selected from the group consisting of isopropyl alcohol, methylethyl ketone, ammonia, acetic acid, and mixtures thereof.

* * * * *